July 22, 1930.   E. A. CONNER   1,770,971
ATTACHMENT FOR STRANDED WIRE STRUCTURES AND PROCESS OF MAKING
Filed Sept. 17, 1927
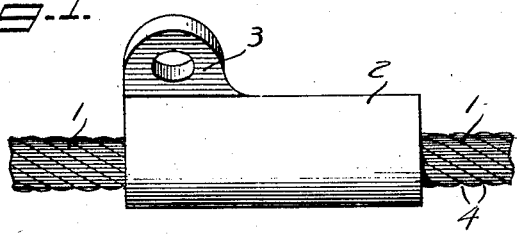
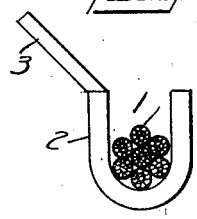 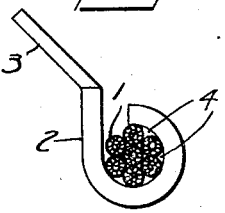 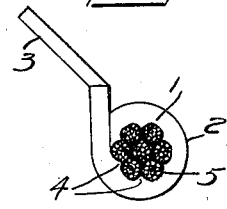
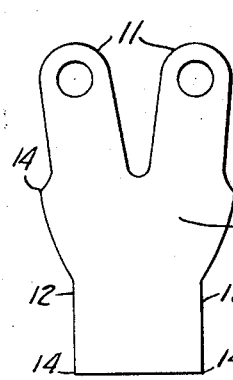 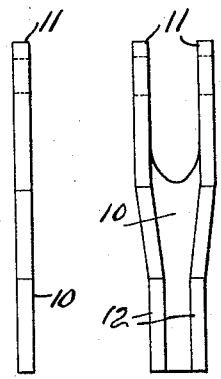  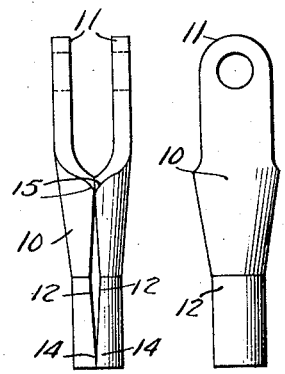
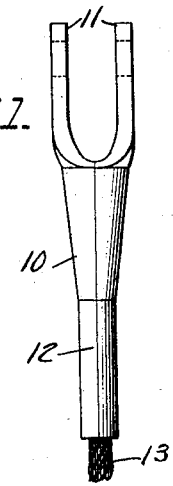 
INVENTOR
EDWARD A. CONNER,
BY
ATTORNEY Patented July 22, 1930

1,770,971

UNITED STATES PATENT OFFICE

EDWARD A. CONNER, OF STRATFORD, CONNECTICUT

ATTACHMENT FOR STRANDED-WIRE STRUCTURES AND PROCESS OF MAKING

Application filed September 17, 1927. Serial No. 220,231.

This invention relates to attachments for stranded wire structures such as wire strand, wire rope, and wire cable, and has for its general object the provision of means for securing to any part of the stranded wire structure such devices as eyes, hooks, yokes, and other connecting members of a similar type; my present application being a continuation in part of my co-pending application, Serial No. 691,219, and also illustrating additional means developed in the practical use of the aforesaid invention for carrying into effect the process therein disclosed.

A method commonly employed for securing attachments to the ends of wire strand, rope or cable consists in the utilizing of "thimbles" so-called. The stranded wire structure is looped about the thimble and secured by splicing, which is not only a laborious operation requiring considerable skill, but also is an operation which seldom results in a union that possesses a degree of strength equal to that of the cable proper, and which constitutes such a bulky structure as to be undesirable in many applications. This method is not adaptable for securing attachments to intermediate portions of the wire structure.

Another conventional method of securing anchoring means and connecting attachments to the ends of cable is that known as "socketing", and consists in passing the end of the cable through a socket, then splaying or spreading the ends of the wire and then filling the interstices of the splayed end with zinc or some other soldering substance.

In that way an enlargement is made at the end of the cable which prevents it from being pulled through the socket whereby it is to be anchored. This method requires in the first place the use of heat and a little more than the average skill found among workmen. Furthermore, any sort of soldering material which can be used at low temperatures is necessarily soft and, consequently, gives way under the severe bending strains and wear to which it is subjected in ordinary service. This method also is not readily adaptable to the securing of stops, anchoring means or attachments at points on the cable intermediate its ends.

Whenever it is desired to secure stops or anchorage attachments at points intermediate the ends of the cable, it is usually customary to use clamps of one kind or another which are fastened with bolts or rivets. For this purpose open U-shaped pieces are frequently employed, which after being put in place in the cable are merely closed about it with pliers or other suitable tools, such attachments being sometimes soldered or brazed for greater security. The soldering or brazing, however, is particularly objectionable for the reason that unless extreme care is taken in the operation the solder or brazing material runs along the cable for a considerable distance on one side or the other, or both sides of the attachment, thus making a portion of the cable undesirably stiff and unyielding, so that the solder filled portion of the cable speedily disintegrates in use. In addition, the use of soldering material frequently requires acid fluxes which are extremely corrosive, and objectionable on that account.

More generally, then, as already indicated, the object of this invention in common with that of my aforesaid application, is to provide an attachment that is adaptable to any part of the stranded wire structure, and which while obviating the above mentioned difficulties, can, at the same time, be firmly and securely fastened, with a relatively low cost, and which can be applied in a reliable manner by the use of a machine not requiring any special skill on the part of the operator.

This general object is accomplished by applying a metal sleeve to the stranded wire structure and impacting the material of the sleeve into the peripheral grooves of the stranded wire structure in such a manner and to such an extent that the sleeve is integrated with the wire structure substantially throughout their mutually exposed areas.

Another object of the present invention is to provide more particularly for securing an attachment firmly upon a stranded wire structure of exceptional length and which has no free ends over which a seamless sleeve may be slipped preparatory to impacting the attachment into the helical peripheral grooves of the wire strand, rope or cable, in accordance with the aforesaid novel process of attachment which forms the generic subject of my above mentioned application.

A further object of the invention is to adapt the aforesaid process for securing attachments to the ends of stranded wire structures of the common type produced by forcibly twisting the wires or strands about the core of the stranded wire structure, the component wires of the latter type of stranded wire structure having a tendency to untwist and spring apart near their ends, a tendency which may be successfully overcome by employing the novel form of attachment herein disclosed, and by utilizing the process of impactment also set forth herein, in pursuance of the invention of my aforesaid application Ser. No. 691,219.

The above and other features of the invention are illustrated and described fully in the accompanying drawings and specification and are pointed out in the claims.

In the drawings:

Fig. 1 is a view of a portion of stranded wire structure to which an attachment is in course of application in accordance with this invention.

Fig. 2 is an end view of Fig. 1.

Fig. 3 is a view of the second step in the process of securing an attachment of the type shown in Fig. 1.

Fig. 4 is a view showing the completion of the final step in the affixing of an attachment of the type shown in Figs. 1, 2 and 3.

Fig. 5 is a detail view in plan and Fig. 6 a view in side elevation of a blank suitable for use in forming an attachment of modified form.

Figs. 7 and 8 are similar views showing the blank partly shaped, preparatory to assembly with the stranded wire structure.

Figs. 9 and 10 show the blank at a subsequent stage of its formation, ready to receive the stranded wire structure.

Figs. 11 and 12 show the assembled wire structure and attachment in final form.

In the illustrated embodiment, referring to Fig. 1, the reference character 1 designates a section of stranded wire cable of conventional type, the portion illustrated being intended to represent part of a wire cable of considerable extent, to which it is desired to secure an attachment.

Under some circumstances, it is inconvenient, and often impossible, to slip the stock of which an attachment is to be formed over the end of such a cable. This difficulty arises, for instance, as hereinbefore noted, when the cable is exceptionally long and has no free ends; or, oftentimes when the cable is of the type hereinbefore mentioned, formed by forcibly twisting the component wires about the core. It has been mentioned, in connection with the latter instance, that the individual wires tend to untwist and spring apart near their ends. Under any of these conditions the adaptation of my process, as shown in Figs. 1, 2, 3 and 4, becomes useful.

In Fig. 1 is shown a side view of a U-shaped piece 2 of metal stock, which is shown in Fig. 2 in front elevation, this piece being provided, for example, with the eye 3 for connection with any desired co-operating structure with which the cable is to be connected.

In carrying the invention into effect, the U-shaped piece 2 is put in the position indicated in Fig. 2 over the cable 1, and the edge brought around as indicated in Fig. 3, until the piece fits closely. The next step consists in forcing the stock of the blank into the helical grooves 4 of the cable. This step is preferably done with work cold, since any temperature which would serve any useful purpose in the operation would be so high that the cable, especially if of high carbon steel as it often is, would be seriously weakened. Forging under heat, therefore, is not, under ordinary conditions, a desirable method of carrying out the step now under consideration.

Therefore, since the step now under consideration is to be carried out with the work cold, a method is desired which will cause such internal and external distortion of the stock of the blank as not only to cause it to "flow" and conform closely to the configuration of the cable but which will do so not only without weakening either the stock or the cable, and also with actual improvement in the quality of the material of the stock. The best way that I have found of carrying out this purpose consists in swaging the stock to shape. The rapid series of light, elastic but high velocity blows causes the stock to closely conform to the configuration of the cable without rupturing or weakening the individual wires of the latter, and without distorting it as a whole otherwise than to slightly compact it.

As shown in Figure 4 the bore of the stock, as indicated at 5 is, after swaging, virtually threaded to conform to the helical grooves of the cable. It is obvious that under these circumstances a strong union is created between the attachment and cable. In point of fact the resistance to parting or rupture is considerably higher than the resistance to parting or rupture of the cable itself, provided proper care is taken to carry the swaging operation to the proper point. I have found that an ordinary hammer swaging machine is admirably adapted for the purpose, since it is easily regulatable and adjustable, and the ordinary workman can be quickly instructed in its use as applied to my process. A rotary swaging machine is, however, entirely satisfactory in instances in which the work may be passed through the dies, and in general the impactment may be otherwise accomplished by any devices suitable to effect the integration necessary to enable the attachment to develop substantially the strength of the cable.

In Figs. 5 to 12 inclusive I have illustrated a modified form of split sleeve attachment which in its general structure corresponds to the form illustrated in Figs. 1-4 inclusive and already described, but which embodies also certain features of construction which have been devised by me in the course of practical use of the invention.

Fig. 5 shows a flat metal blank 10 of a shape suitable to be formed into an attachment having the final form illustrated in Figs. 11 and 12, and Figs. 7 to 10 illustrate several stages in the formation of such an attachment.

The first stage, shown in Figs. 7 and 8, includes the bending of the blank 10 into a form having a substantially U-shaped cross-section, which brings the eyes 11 into position, at opposite sides of the attachment, to receive a bolt (not shown), when the device is put into use to connect a wire cable with some other structure with which the connection is to be effected.

The next stage comprises the further bending of the longitudinal margins 12 of the blank around to form a sleeve which is of substantially cylindrical cross-section, as shown in Figs. 9 and 10, and of a diameter which is preferably sufficiently larger than that of the cable to permit the sleeve to be slipped over an end of the cable 13 where that is possible, although this operation may be performed with the cable in place, if so desired.

In either event, this bending having been carried to an extent which brings the marginal points 14 and 15 into contact, as indicated in Fig. 9, the impactment of the sleeve into the peripheral grooves of the cable 13 is then effected by applying forces to the periphery of the sleeve preferably in the manner hereinbefore described with reference to the formation of the attachment illustrated in Figs. 1-4, until the material of the sleeve fills the voids in the periphery of the cable and grips the same firmly, resulting in the integration of the attachment with the cable, forming a unitary structure as shown in Figs. 11 and 12. The attachment thus formed is compact and reliable, as the uniformity of the dimensions of the stock, and the method of applying the blank to the stranded wire structure, make it possible to secure great exactness in the degree of compactment necessary to carry out the objects of the invention.

I claim:

1. The process of forming an attachment for stranded wire structure which comprises bending a sheet of metal stock to form a sleeve of a diameter approximating that of the stranded wire structure and impacting said sleeve into the peripheral grooves of the stranded wire structure until the voids thereof are filled substantially throughout their mutually exposed areas.

2. The process of forming an attachment for stranded wire structure which comprises forming a sheet of metal stock into a blank having a portion adapted to constitute a sleeve to surround said stranded wire structure, and also having a portion adapted to constitute a connection with a co-operating structure, then bending said sleeve portion to form a sleeve of a diameter approximating that of the stranded wire structure and impacting said sleeve into the peripheral grooves of the stranded wire structure, leaving said connector portion projecting beyond said sleeve.

3. The process of forming an attachment for stranded wire structure which comprises forming a sheet of metal stock into a blank having a portion adapted to constitute a sleeve to surround said stranded wire structure and also having a portion adapted to constitute an eye for connection with a cooperating structure, then bending said sleeve portion to form a sleeve of a diameter approximating that of the stranded wire structure and impacting said sleeve into the peripheral grooves of the stranded wire structure, leaving said connector portion projecting beyond said sleeve.

4. The process of forming an attachment for stranded wire structure which comprises forming a sheet of metal stock into a blank having a portion adapted to constitute a sleeve to surround said stranded wire structure, and also having a plurality of portions adapted to constitute eyes for a portion adapted to constitute a connection with a co-operating structure, then bending said sleeve portion to form a sleeve of a diameter approximating that of the stranded wire structure and impacting said sleeve into the peripheral grooves of the stranded wire structure, leaving said connector portion projecting beyond said sleeve.

5. The process of forming an attachment for a stranded wire structure which comprises bending a sheet of metal stock around the stranded wire structure to form a sleeve and impacting said sleeve into the peripheral grooves of the stranded wire structure until the voids thereof are filled substantially throughout their mutually exposed areas.

6. The process of forming an attachment for a stranded wire structure which comprises bending a sheet of metal stock around a portion of the stranded wire structure intermediate the ends thereof to form a sleeve and impacting said sleeve into the peripheral grooves of the stranded wire structure until the voids thereof are filled substantially throughout their mutually exposed areas.

7. The process of forming an attachment for a stranded wire structure which comprises cutting from flat metal stock a blank having marginal projections of predetermined extent, then bending said blank to form a sleeve of a diameter determined by bringing said marginal projections into contact with each other and impacting said sleeve into the peripheral grooves of the stranded wire structure until the voids thereof are filled substantially throughout their mutually exposed areas.

8. The process of forming an attachment for a stranded wire structure which comprises cutting from flat metal stock a blank having marginal projections of predetermined extent, then bending said blank to form a sleeve of a diameter determined by bringing said marginal projections into contact with each other then applying said sleeve to said stranded wire structure over an end thereof, and impacting said sleeve into the peripheral grooves of the stranded wire structure until the voids thereof are filled substantially throughout their mutually exposed areas.

9. An attachment for stranded wire structure comprising a split sleeve secured upon the periphery of said stranded wire structure by the process of impactment, the material of said sleeve filling the peripheral grooves of said stranded wire structure substantially throughout their mutually exposed areas.

10. An attachment for stranded wire structure comprising a split sleeve secured upon the periphery of said stranded wire structure by the process of impactment, the material of said sleeve filling the peripheral grooves of said stranded wire structure substantially throughout their mutually exposed areas, said sleeve having an integral eye portion to constitute a connector.

11. An attachment for stranded wire structure, comprising a split sleeve secured upon the periphery of said stranded wire structure by the process of impactment, the material of said sleeve filling the peripheral grooves of said stranded wire structure substantially throughout their mutually exposed areas, said sleeve having a plurality of eye portions to constitute a yoke for connection with a cooperating structure.

12. An attachment for stranded wire structure, comprising a split sleeve secured upon the periphery of said stranded wire structure by the process of impactment, the material of said sleeve filling the peripheral grooves of said stranded wire structure substantially throughout their mutually exposed areas, said sleeve having a plurality of eye portions to constitute a yoke for connection with a co-operating structure, the eye-openings being arranged in spaced opposed relation to receive a connecting bolt.

13. The combination with a stranded wire structure of the type comprising wire components having an expansile tendency, of a split metal attachment sleeve bent around said expansile structure and secured thereon by the process of impactment to confine and compact said expansile components, filling the peripheral voids therebetween substantially throughout the mutually exposed areas of said sleeve and stranded wire structure.

In testimony whereof, I have signed this specification.

EDWARD A. CONNER.